July 21, 1925.

K. E. HILTHON ET AL

MEAT SAW

Filed Nov. 19, 1923

1,546,982

INVENTORS
Karl E. Hilthon
Earl S. Hicks
BY
ATTORNEY.

Patented July 21, 1925.

1,546,982

UNITED STATES PATENT OFFICE.

KARL E. HILTHON AND EARL S. HICKS, OF DETROIT, MICHIGAN.

MEAT SAW.

Application filed November 19, 1923. Serial No. 675,498.

*To all whom it may concern:*

Be it known that we, KARL E. HILTHON and EARL S. HICKS, citizens of the United States, residing at Detroit, in the county of Wayne and State of Michigan, have invented a new and useful Improvement in a Meat Saw, of which the following is a specification.

Our invention relates to a new and useful improvement in a meat saw and is particularly adapted for making the scribe cut in dressed pork and similar cuts in other animals to be dressed.

An object of the invention is the provision of a meat saw which will be simple in structure, economical of manufacture and highly efficient in use.

Another object of the invention is the provision of means for limiting the thrust of the saw in making the various cuts.

Another object of the invention is the provision of means for mounting a saw adapted for being driven by power and provided with a shield at opposite sides thereof, one of the shields being adjustable for regulating the depth of the cut made by the saw.

Other objects will appear hereinafter.

The invention consists in the combination and arrangement of parts hereinafter described and claimed.

Figure 1:
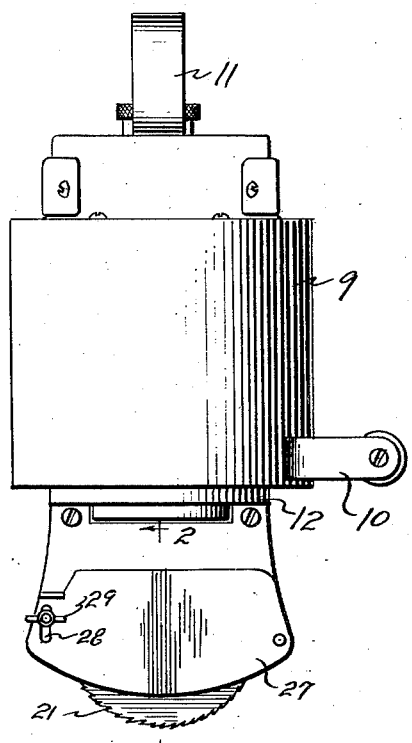
Figure 2:
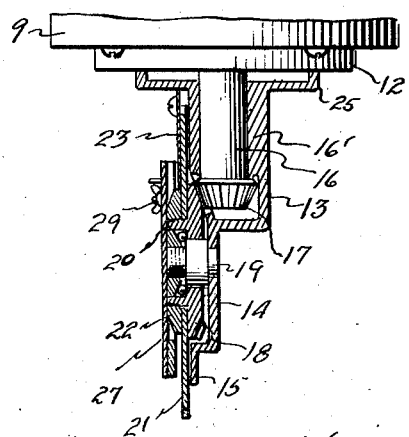
Figure 3:
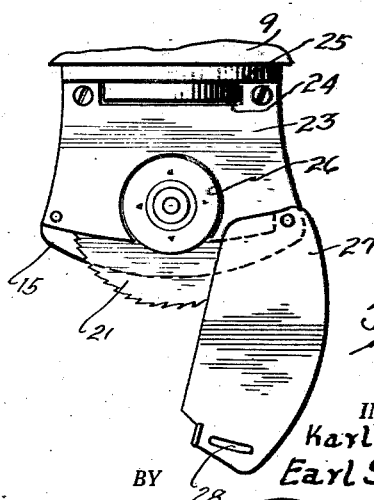

The invention will be best understood from a reference to the accompanying drawings which form a part of this specification and in which, Fig. 1 is an elevational view of the invention, Fig. 2 is a sectional view taken on substantially line 2—2 of Fig. 1, and, Fig. 3 is a fragmentary side elevational view of the invention showing one portion of the shield displaced.

The invention is particularly adapted for making the scribe cut in dressing pork, although as the description proceeds it will appear that the device may be used for making other cuts of meats. In dressing the pork the loin is severed from the spare ribs by sawing the ribs intermediate the ends of the ribs and the back bone. The loin is then removed and the spare ribs cut away, with a very small portion of meat clinging thereto. The portion lying under the spare ribs is generally used for making bacon and if the saw, in making the scribe cut, has passed through the ribs sufficiently to mark the meat lying under the ribs it is necessary to cut the bacon slab along this mark, irrespective of the point or line on which the lean of the meat terminates. With the present invention the saw is so regulated as to permit its passage through the ribs only sufficient to sever the ribs. The slab of bacon forming meat may then be cut along the line of termination of the lean, thus, in many cases, allowing for a larger amount of bacon than would be the case if the saw in making the scribe cut was allowed to mark the meat lying adjacent the ribs.

The invention in its preferred form comprises a casing 9 in which is positioned a suitable electrically driven motor, although any suitable means of driving the saw used in the device may be used. The casing 9 is provided with a pair of handles 10 and 11 for holding the device when it is in operation. A flange 12 is mounted to the lower portion of the casing 9 and is provided with a neck 13 having an outwardly projecting supporting portion 14 provided with an abutment flange 15. Mounted in the neck 13 is a shaft 16 which is embraced by a suitable portion 16'. The shaft is fastened at one end to the shaft of the motor in the casing 9 and is provided at its opposite end with a gear 17 adapted to mesh with the gear 18 which is mounted on the shaft 19. The gear 18 is provided at its hub with an exteriorly threaded flange 20 upon which is positioned a circular saw 21. A nut 22 serves to retain the saw in position on the flange. A shield 23 is mounted on the laterally projecting flanges of the neck by means of suitable bolts or screws and serves to act as a guide for the saw. This shield 23 is provided adjacent its upper end with a recess 24 adapted for the reception of the bulge 25 which projects from the member 12. The shield 23 is also provided with an opening 26 for the accommodation of the nut 22. Pivotally mounted at one side of the lower end of the portion 15, is an adjustment shield 27 which serves as a shield for the saw and at the same time an abutment to prevent the undue entry of the saw into the material operated upon. This shield 27 is provided adjacent its free end with a slot 28 through which may be projected a bolt having a wing nut 29 cooperating therewith. By means of this bolt and wing nut the position of the shield 27 relatively to the cutting edge of the saw 21 may be regulated.

The power is transmitted, in operating the device, from the motor in the casing to the shaft 16 which in turn brings about a rotation of the saw through the use of the gears 17 and 18.

While we have illustrated and described the preferred form of structure we do not wish to limit ourselves to the precise forms of structure shown but desire to avail ourselves of such variations and modifications as come within the scope of the appended claim.

Having thus described our invention what we claim as new and desire to secure by Letters Patent is:

A device of the class described comprising a casing for a motor, a housing depending from said casing and enclosing a shaft secured to the motor shaft, a gear mounted on said first mentioned shaft, said housing having a part thereof projecting downwardly and provided with a bearing, a shaft mounted in said bearing, a rotary saw mounted on said shaft to rotate therewith, said housing and projecting part being recessed and widened to receive and project laterally to the front and rear of the saw and to provide a guard having one side thereof lying closely adjacent thereto and beyond which only a small portion of the saw projects, a partial guard for the other side of the saw secured to said part and a section forming a combined gauge and guard adjustably secured to said projecting part.

In testimony whereof we have signed the foregoing specification.

KARL E. HILTHON.
EARL S. HICKS.